United States Patent Office 3,730,919
Patented May 1, 1973

3,730,919
PROCESS FOR PRODUCTION OF RIGID SELF-SKINNING POLYURETHANE FOAM
James M. McGinn, Naugatuck, Conn., assignor to Uniroyal, Inc., New York, N.Y.
No Drawing. Filed Mar. 9, 1970, Ser. No. 17,921
Int. Cl. C08g 22/44, 22/34
U.S. Cl. 260—2.5 AZ                      4 Claims

ABSTRACT OF THE DISCLOSURE

Rigid polyurethane foam with an integral solid skin is molded by a one-shot method using a formulation based on a diisocyanate [e.g., polymeric methylene bis-(phenyl-4-isocyanate)] and two polyols, one of which (e.g., propylene oxide adduct of N-aminoethyl piperazine) will react vigorously with the isocyanate, and the other of which (e.g., polypropylene oxide adduct of glycerine) will react sluggishly with the isocyanate. A chelating agent (e.g., acetyl acetone) prevents metal ion contaminants from bringing about undesired side reactions. Blowing agent is included, as may be surfactant and catalyst. Control over the thickness of the solid skin may be exercised by varying the catalyst concentration and/or the ratio of the polyols.

BACKGROUND OF THE INVENTION (1) Field of the invention

This invention relates to a composition and method for making a novel self-skinning rigid polyurethane foam by a one-shot technique.

(2) Description of the prior art

For many years those skilled in the art of rigid urethane foam moldings have recognized the advantages and potential of a molded sandwich structure, that is, a rigid foam molding with a low density core and a hard, unblown skin. Although some skin usually tends to form naturally on polyurethane foam during the foam formation, such skin is minimal. In recent years it has become commercially important to obtain a skin of substantial thickness. The prepolymer route can be used to produce a skin, but unfortunately the prepolymer procedure is time consuming and costly and the prepolymer has to be used up within a fairly short time due to its inherent instability. Attempts in the past to produce a skin by a single pour technique have been many and varied. Some examples of these attempts include excessive overpack, mixed blowing agents, very cold molds and even elaborate machinery which sheared the top surface of freshly risen foam. This invention is based on a more effective, chemical approach to self-skinning foam.

French Pat. 1,486,246, Tarpon International Ltd., published June 23, 1967, Belgian Pat. 706,719, Ugine-Kuhlmann, Apr. 1, 1968, and U.S. Pat. 3,468,991, Krug, Sept. 23, 1969, are representative of prior disclosures relating to self-skinning rigid urethane foam.

U.S. Pats. 3,251,787, Bedoit, and 3,251,788, Currier et al., May 17, 1966, teach the production of polyurethane foams from certain propylene oxide-amine adducts, but these patents are not suggestive of any way of providing an integral skin of uniformly controlled thickness on the foam.

U.S. Pat. 2,912,414, Schultheis et al., Nov. 10, 1959, employs disalicylal ethylene diamine and the like as retarders which extend the pouring time of polyolpolyisocyanate mixtures used to make solid polyurethane, but nothing in this patent is suggestive of the present invention.

SUMMARY OF THE INVENTION

The present invention is based on the discovery that the use, in a one-shot polyurethane foam formulation, of a blend of two different polyols, one of which will react vigorously with the isocyanate and another which will react sluggishly with the isocyanate, results in a self-skinning foam, provided that side reactions are suppressed. The role of the rapidly reacting polyol is to rapidly initiate the foaming mass and impart to the foam enough strength to rise without collapsing. The role of the slowly reacting polyol is to act as a plasticizer in the rising foaming mass since its degree of polymerization is much less than that of the rapidly acting polyol at any time prior to completion of the reaction. It is this plasticizing effect of the sluggishly acting polyol that is believed to cause the cell breakdown (solid skin formation) at the foam-mold interface in the present process. Suppression of side reactions such as isocyanate-urethane, isocyanate-isocyanate, or isocyanate-urea by means of a chelating agent is essential to the process of the invention and enables the desired isocyanate-alcohol reaction to proceed to quick high conversion, with resulting formation of a skin of uniformly controlled thickness.

The invention thus provides a molded item which possesess an integral, distinct, even, high density skin around its entire outer surface. It is also possible, by formulation variations as will appear hereinbelow, to produce a very thick skin on one surface of the molded item, with little or no skin on the opposite surface.

DETAILED DISCLOSURE

The one-shot self-skinning composition for making a rigid polyurethane foam having an integrally formed solid skin in accordance with the invention comprises, in admixture,
  (a) an organic polyisocyanate,
  (b) a polyol which reacts vigorously with (a),
  (c) a polyol which reacts sluggishly with (a),
  (d) a chelating agent which inhibits the catalytic activity of trace metal ions in (a), (b) and (c), and
  (e) a volatile organic liquid blowing agent.

The usual, conventional organic polyisocyanate component is employed in the formulation. This may be described as a polyisocyanate having a functionality of from 2 to about 3, and may be aromatic, aliphatic or cycloaliphatic. Examples are "MDI" (methylene bis[phenyl-4-isocyanate], also called p,p'-diphenylmethane diisocyanate), whether pure or in so-called crude form, including dimeric and higher polymeric species thereof, notably "PAPI" (polymeric methylene polyphenylisocyanate) which has a functionality of 2.9. Another example is "TDI," tolylene diisocyanate, usually sold as an 80/20% or 65/35% mixture of the 2,4-/2,6-isomers. This also has so-called crude and polymeric forms. Additional suitable isocyanates are disclosed for example in 3,251,787, col. 2, 1. 42–52. Although any of these diisocyanates may be used to carry out the invention, minor differences are observed in the final self-skinned rigid foam product. PAPI gives the hardest skin and strongest foam, because its high functionality creates a tighter network. The polymeric or crude forms of MDI have a somewhat lesser effect than PAPI. TDI cured foams apparently are slightly softer, although skin hardness comes close or is equal to that obtained from polymeric MDI. Polymeric TDI produces foams whose characteristics are between those from crude MDI and TDI.

The polyol component of the mixture is, as indicated, made up of two different kinds of polyol, one of which has a low activation energy (that is, it reacts rapidly with isocyanate) and the other of which has a high activation energy (that is, it reacts sluggishly with isocyanate).

As the rapidly reactive polyol, particularly suitable materials are the tertiary nitrogen containing polyethers. These frequently have an hydroxyl number of from about 300 to about 900, preferably 350 to 800, and may be described as amine-initiated polyols, or polyalkylene oxide adducts of primary or secondary amines. Condensation products of such alkylene oxides as ethylene oxide, propylene oxide, etc., especially branched products, made with such amines as N-aminoethyl piperazine, diethylene triamine, ethylene diamine, tolylene diamine, and the like as described for example in 3,251,787, 3,251,788, 3,328,-320, col. 3, l. 32–57, may be used. Propyloxylated amines of this kind are particularly preferred.

For use as the second polyol, that is, the sluggishly reactive polyol, there may be used a polyol which is less reactive than the foregoing type of polyol. Thus, polyols not containing tertiary nitrogen are particularly suitable. Among these may be mentioned the polyhydric alcohol initiated polyethers, formed by condensation of a polyalkylene oxide with a polyhydric alcohol (see, for example 3,377,296, col. 3, l. 67 to col. 4, l. 9). They may be described as frequently having an hydroxyl number of from about 40 to 700, preferably 45 to 600. Preferred are alkyleneoxylated, especially propoxylated, materials such as glycerine, alpha-methyl glucoside, sorbitol, pentaerythritol, etc.

The ratio of rapidly acting polyol to slowly acting polyol will ordinarily be within the range of from 35:65 to 65:35, preferably 45:55 to 55:45 by weight, although other ratios may also be used if desired. If desired, more than one rapidly acting polyol and/or more than one slowly acting polyol may be employed in the formulation.

In practicing the invention, the components of the rigid polyurethane foam are chaged to a mold cavity having the shape of the desired article, conveniently with the aid of a conventional pumping and mixing machine which meters the ingredients in liquid form in predetermined amounts and intimately mixes the ingredients immediately before introducing the ingredients, as a thoroughly mixed fluid stream, through a suitable opening in the mold provided for this purpose. Aside from the special combination of ingredients employed in the invention, the machinery, procedure, and parameters of the molding operation may otherwise be the same as for conventional rigid urethane foams, and are well known to those versed in the art. The process of the invention can be carried out without the need of specially designed high pressure molds.

A suitable procedure for making the integral skin molded item involves the use of a two component foam system. Component A is an isocyanate-containing component. Component B is the polyol-containing component and is made up as indicated previously of a blend of two polyols, one of which will react vigorously with the isocyanate, and the other of which will react sluggishly with the isocyanate. In accordance with the invention, it is extremely important that provision be made for suppressing side reactions, that is, reactions other than the isocyanate-polyol reaction. Such suppression of side reactions is suitably accomplished in the method of the invention by including in the composition, typical in part B (the polyol-containing component), a chelating agent which inhibits the catalytic effect on side reactions of trace metal ions which are normally inherent in the isocyanate or either polyol. This agent is extremely important for purposes of the invention since it has been found that optimum controlled skin formation will occur only when the isocyanate-alcohol reaction proceeds to quick conversion of monomer with substantially no side reactions occurring such as isocyanate-urethane, isocyanate-isocyanate, or isocyanate-urea. Suitable chelating agents for this purpose include 2,4-pentanedione (also called acetylacetone), benzoylacetone, alizarin, quinaldic acid (also called quinaldinic acid or quinoline-2-carboxylic acid), alpha-nitroso-beta-naphthol, dithizon (also called diphenylthiocarbazone), and the like.

A blowing agent of the kind conventionally used in making polyurethane foam, usually a volatile organic liquid, is also included, conveniently by incorporation in component B. As is well known, such blowing agents include the volatile organic liquids boiling within the range of from 50° to 150° F., such as pentane, trichloroethane, trichloroethylene, tetrachloroethylene, trichlorofluoromethane, methylene chloride, trichlorotrifluoromethane, dibromotetrafluoroethane, carbon tetrachloride, etc. If desired, water may be included, particularly if a less dense skin is required.

Optionally, a surfactant, such as is conventionally used in making polyurethane foam, is desirably included in the formulation to help achieve a finer cell structure and optimum expansion of the foam. As is well understood by those skilled in this art, organic surfactants including organo-silicone compounds, such as silicone glycol copolymers (see, for example 3,377,296, col. 6, l. 9–41; 3,380,-967, col. 6, l. 7–14) are suitable.

A catalyst for the isocyanate-polyol reaction, such as is conventionally used in polyurethane foam may be included in the formulation as in conventional practice, most appropriately as part of component B. The suitable catalysts are those commonly used in the trade to promote the reaction between hydroxyl and isocyanate groups, and form the desired cured product. They are frequently either tertiary amine compounds as for example dimethyl ethanolamine, N,N-dimethyl cyclohexylamine, triethylene diamine, triethylamine, dimethyl aniline, pyridine, ethyl morpholine, quinoline, etc. or organometallic compounds such as dibutyltin dilaurate, tin mercaptides, n-butyltin trichloride, trimethyltin hydroxide, dimethyltin dichloride, mercury acetate, cobalt naphthenate and others. These catalysts vary in their accelerating efficacy, and a combination of catalysts, e.g., tertiary amine and an organotin compound may be employed. The concentration and choice of catalyst afford a way of controlling the formation of an even skin. Usually, at low catalyst levels the plasticizing effect of the slower reacting polyol is more pronounced and the skin formed at the lower portions of the mold is thicker than at the upper mold surface. Conversely as the catalyst concentration is increased the plasticizing effect of the slower reacting polyol is minimized and a more even skin thickness is achieved throughout the surface of the foam.

Other additives such as filters, extenders, additional surface active agents, and flame retardants may also be incorporated, usually into component B. Surface active agents create an affinity for the polyol by the isocyanate and reduce incompatibility, leading to a product having a better appearance. Surfactive agents may be added to the reaction mixture at any time during the mixing procedure.

Component A and component B are metered in appropriate proportions into a common stream which is thoroughly mixed just prior to injection into the mold cavity, which is partially filled by the mixture. Exothermic reaction between the components of the mixture sets in at once in the mold, with consequent increase in temperature of the reacting mass, resulting in volatilization of the blowing agent and foaming of the mass as the urethane polymer is formed. Within a short time the closed mold cavity thus becomes completely filled by the rising polyurethane foam composition, which finally solidifies as the urethane foaming reaction becomes sufficiently advanced. The final cured, molded item as subsequently removed from the mold possesses a low density, cellular core and a high density, non-cellular skin. This composite structure is the result of the above-described chemical action, which creates conditions in the rising foam by which the cellular structure at the foam-mold interface is collapsed, forming the skin.

The proportions of ingredients in the formulation may be essentially in accordance with conventional practice. By way of non-limiting example the proportions shown in the Table I are applicable to the particular ingredients named in the table, although those skilled in the art will understand that with other specific ingredients or under varying circumstances, other proportions may be appropriate. In any given case, particular proportions will be found most appropriate to any given article to be manufactured, depending on such variables as the exact properties desired, the size of the article, the particular apparatus employed, etc.

TABLE I.—TYPICAL PROPORTIONS

|  | Pbw.[1] range | Preferred Pbw. range |
|---|---|---|
| Component B: |  |  |
| 1. Polyol I (propylene oxide adduct of N aminoethyl piperazine OH 525) | 30–60 | 45–55 |
| 2. Polyol II (propylene oxide adduct of glycerine OH 384) | 40–70 | 45–55 |
| 3. Organo-silicone surfactant | 0.2–3.0 | 0.5–1.5 |
| 4. Acetylacetone (chelating agent) | 0.5–2.0 | 1.0–2.0 |
| 5. Surface active agent ethylene oxide adduct of propylene OH 56 | 0–15 | 2–6 |
| 6. Modified tin mercaptide (catalyst) | 0–2 | .005–.1 |
| 7. Trimethyl piperazine (catalyst) | 0–3 | .3–2.5 |
| 8. Dimethylethaolamine | 0–4 | .5–3.0 |
| 9. Trichloro=onofluoromethane | 5–50.0 | [2] 5–50.0 |
| Component A: MDI | 110–140 | 120–135 |

[1] Pbw.=parts by weight, per 100 parts of polyol.
[2] Density dependent.

If it is desired to produce a thicker skin on one side of the molded foam than on another side, the catalyst level may be reduced and/or the proportion of rapidly reacting polyol may be reduced, in which case the skin on the lower or bottom portions of the molding will tend to be thicker than the skin on the upper or top portions of the molding.

The following examples, in which all parts are expressed by weight, will serve to illustrate the practice of the invention in more detail.

EXAMPLE I

This example illustrates making a rigid urethane foam molding in the shape of a bookshelf, having a low density cellular interior and an integral solid skin on all exterior surfaces. The mold is made of urethane elastomer supported on the outside by a plywood box reinforced by channel iron. The mold cavity, coated with wax to make parting easier, is 60 inches long and has a volume of about 720 cubic inches. The mold is supported in a nearly vertical position (75° angle with the flood). An injection hole is located in the mold approximately 20 inches from the base; this is connected by a hose to a variable speed pumping and mixing machine of a kind conventionally employed in making urethane foam. Two liquid components are fed to the machine. Component A is crude MDI having a functionality of about 2.3. Component B has the following formulation:

|  | Parts |
|---|---|
| Polyol I | 50 |
| Polyol II | 50 |
| Surfactant | 1 |
| Catalyst | 1 |
| Blowing agent | 20 |
| Chelating agent | 1 |

Polyol I is Jefferson Chemical Co. R–350X, propoxylated N-aminoethyl piperazine, hydroxyl number 500 (see 3,251,788). Polyol II is Jefferson Chemical Co. G–400, glycerine initiated propylene oxide polyol, hydroxyl number 390. Suitable surfactant is an organosilicone (e.g., siloxane-oxyalkylene block copolymer, 3,377,296, col. 6, 1.29–37, Silicone L520 or DC193). The catalyst is dimethylethanolamine, blowing agent is trichlorofluoromethane and chelating agent is acetylacetone (2,4-pentanedione). The output of the machine is 70 pounds per minute, made up of a mixture of Component A at the rate of 36.4 pounds per minute and Component B at the rate of 33.6 pounds per minute. The injection time is 11.4 seconds, delivering 13.3 pounds of the mixture to the mold; this represents approximately 20% overpack. The chemicals then react and the mixture rises up in the 60 inch direction, filling the closed mold. Twenty minutes are allowed for cure, after which the mold support is disassembled and the finished molded shelf is de-molded by peeling the urethane elastomer mold away from the shelf. The molded density of the shelf, trimmed of all flash, is 31.5 pounds per cubic foot. The interior or core of the shelf is a closed cell rigid foam having a density of about 19 pounds per cubic foot. The core is completely surrounded on all sides by a uniform layer or skin of non-cellular solid rigid polyurethane having a thickness of about ⅛ inch and a density of 65 pounds per cubic foot, formed integrally with and of the same material as the core, by the above-described self-skinning action resulting from the presence of the two different polyols in the formulation, along with the acetylacetone chelating agent.

EXAMPLE II

This example illustrates how the thickness of the skin may be varied on a selected side of the molded object in accordance with the invention. The procedure of Example I is repeated, using the same formulation except that Polyol I and Polyol II are in 40:60 ratio. The core of the resulting molded foam has a density of 15 pounds per cubic foot. The skin on the upper portion of the molding has a thickness of .002 inch and a density of 30 pounds per cubic foot. The skin on the bottom of the molding has a thickness of ¼ inch and a density of 60 pounds per cubic foot. The skin is evenly tapered from the bottom to the top of the molding.

The foregoing examples may be repeated, using other chelating agents in place of acetylacetone, such as benzoylacetone, alizarin, quinoldic acid, alpha-nitroso-beta-naphthol, dithizon, etc. The chelating agent is usually used in amount of at least .2 part, preferably .5 to 1 or 2 parts (per 100 parts of polyols). There is no critical upper limit on the amount of chelating agent, and although 3 to 5 parts or more (e.g., 10 parts) can be used such larger amounts are ordinarily unnecessary.

EXAMPLE III

A series of runs are made according to the formulations shown in Table II, using amine-initiated polyol (Run 1), alcohol-initiated polyol (Run 7), or mixtures of two kinds of polyol in accordance with the invention (Runs 2–6 and 8–11). In each case the amount of diisocyanate is adjusted appropriately to the hydroxyl value of the polyols and the catalyst concentration is adjusted appropriately to the reactivity of the polyols to give a cream time of about 15–20 seconds. In the mixes based on mixed polyols, a surface-active material ("L–61," ethylene oxide extended polypropylene glycol, hydroxyl number 40) is included to improve the compatibility. The ingredients are added at room temperature to a one liter container while stirring vigorously. The diisocyanate is added last and stirring is continued for 15 seconds; then the mix is poured into a 12 to 12 by 1 inch closed mold (wax coated) having a temperature of 85° F., tilted longitudinally at 75°. The foam is allowed to rise freely. After 10 minutes the mold is taken apart and the rigid foam article removed. Samples 1 and 7 (both outside the invention) exhibit only minimal skin formation throughout the periphery whereas the samples of the invention (2–6 and 8–11) based on mixed polyols are covered with a skin about ¹⁄₁₆ inch thick on all sides, plus or minus ¹⁄₃₂ inch, with skin densities ranging from 56 to 58 pounds per cubic foot, core densities 15 to 20 pounds per cubic foot. All of the polyols in Table II are propoxylated materials, made with amine initiators or polyhydric alcohol initiators as follows, and have the hydroxyl numbers shown:

| Polyol | Amine initiator | OH No. |
|---|---|---|
| A (R-350X Jefferson Chemical) | N-aminoethyl piperazine | 500 |
| B (R-650X Jefferson Chemical) | do | 450 |
| C (LA-700 Dow Chemical) | Diethylene triamine | 700 |
| D (LA-475 Dow Chemical) | do | 475 |
| E (Quadrol Wyandotte Chemical) | Ethylene diamine | 770 |
| F (Daltolac-50 ICI) | Tolylene diamine | 480 |
| | Polyhydric alcohol initiator | |
| G (G-400 Jefferson Chemical) | Glycerine | 390 |
| H (MEG-400 Corn Products) | Alpha-methyl glucoside | 400 |
| I (RS-700 Jefferson Chemical) | Sorbitol | 490 |
| J (Pep-450 Wyandotte Chemical) | Pentaerythritol | 560 |
| K (SF-1000 Jefferson Chemical) | Glycerine | 56 |

The other ingredients of the mixes shown in Table II are identified as follows:

Catalyst: dimethylethanolamine.
Chelating agent: acetylacetone.
Surfactant: organosilicone (e.g. DC-193 or L520).
Surface active agent: L-61, ethylene oxide extended polypropylene glycol, OH value 46.
Blowing agent: trichlorofluoromethane.
Diisocyanate: methylene bis(phenyl-4-isocyanate).

TABLE II.—FOAM FORMULATIONS (PARTS BY WEIGHT)

| Ingredients: | Run number | | | | | | | | | | |
|---|---|---|---|---|---|---|---|---|---|---|---|
| | 1 | 2 | 3 | 4 | 5 | 6 | 7 | 8 | 9 | 10 | 11 |
| Polyol: | | | | | | | | | | | |
| A | 100 | | | | | | | 50 | 50 | 50 | 50 |
| B | | 50 | | | | | | | | | |
| C | | | 50 | | | | | | | | |
| D | | | | 50 | | | | | | | |
| E | | | | | 50 | | | | | | |
| F | | | | | | 50 | | | | | |
| G | | 50 | 50 | 50 | 50 | 50 | 100 | | | | |
| H | | | | | | | | 50 | | | |
| I | | | | | | | | | 50 | | |
| J | | | | | | | | | | 50 | |
| K | | | | | | | | | | | 50 |
| Catalyst | 0 | 1.5 | 0 | 1.0 | 1.0 | 2.5 | 4.0 | 1.0 | 2.5 | 2.0 | 2.0 |
| Chelating agent | 1.0 | 1.0 | 1.0 | 1.0 | 1.0 | 1.0 | 1.0 | 1.0 | 1.0 | 1.0 | 1.0 |
| Surfactant | 1.0 | 1.0 | 1.0 | 1.0 | 1.0 | 1.0 | 1.0 | 1.0 | 1.0 | 1.0 | 1.0 |
| Surface active agent | 0 | 4.0 | 4.0 | 4.0 | 4.0 | 4.0 | 0 | 4.0 | 4.0 | 4.0 | 4.0 |
| Blowing agent | 20 | 20 | 20 | 20 | 20 | 20 | 20 | 20 | 20 | 20 | 20 |
| Diisocyanate | 130 | 105 | 135 | 108 | 143 | 108 | 120 | 113 | 125 | 94 | 84 |
| Results: Skin | (2) | (1) | (1) | (1) | (1) | (1) | (2) | (1) | (1) | (1) | (1) |

1 Excellent.
2 None.

In general the invention enables a skin thickness from about 1/64 inch to 1/2 inch to be obtained with a preferred range of from 1/32 inch to 1/4 inch at skin densities of from 25 to 70 pounds per cubic foot but preferably from 45 to 65 pounds per cubic foot. Usually a core density of 2 to 55 pounds per cubic foot may result preferably a range of 4 to 20 pounds per cubic foot.

The invention does not require extreme mold pressures or extreme overpack, such as are used in prior practice; also, the inconvenience and expense involved in the conventional prepolymer method are avoided. Unlike certain prior art methods, the invention imposes no restrictions as to mold materials, whether metallic or nonmetallic.

Although not very much is known about the mechanism involved in the invention, it appears that the relatively vigorously reacting polyol drives the reaction forward with a considerable amount of exotherm. A temperature gradient exists extending from approximately the center of the core mass to the surface. The already formed cell structures—due to the evaporation of the blowing agent—provides a certain degree of insulation, preventing the reaction between the diisocyanate and the less reactive polyol to proceed too rapidly. Although it is understood that both type polyols will react with the isocyanate from the time they have been mixed, the rates of reaction are different enough to enable the slower reaction polyol to act as a plasticizing agent. Thus the formation of bubbles especially at the periphery of the rising foam is prevented. It is know that rigid polyurethane foams form a skin, however, the thickness of the skin is much less than can be obtained by the application of this invention. Substantially thicker and tougher skins can be produced even at minimal mold pressures.

Having thus described the invention, what is claimed and desired to be protected by Letters Patent is:

1. A one-shot method of making an integral solid skinned rigid polyurethane foam article comprising charging to a closed mold a composition comprising in admixture:
  (a) an organic polyisocyanate having a functionality of from 2 to 3;
  (b) a polyol which reacts vigorously with (a) which is an oxyalkylated polyamine having an hydroxyl number of from 300 to 900;
  (c) a polyol which reacts sluggishly with (a) which is an oxyalkylated polyhydric alcohol having an hydroxyl number of from 40 to 700;
  (d) from 0.5 to 2.0 parts, per 100 parts by weight of (b) plus (c), of a chelating agent; and
  (e) a volatile organic liquid blowing agent; the said composition foaming in the said closed mold and changing to a rigid state with an integrally formed rigid solid skin on the outer surface, and thereafter removing the resulting article from the mold, the ratio of (b) to (c) being from 35:65 to 65:35, by weight, and (d) being selected from the group consisting of acetylacetone, benzoylacetone, alizarin, quinaldic acid, alpha-nitroso-beta-naphthol and dithizon.

2. A one-shot method of making an integral solid skinned rigid polyurethane foam article comprising charging to a closed mold a composition comprising, in admixture:
  (a) an organic polyisocyanate having a functionality of from 2 to 3;
  (b) a polyol which reacts vigorously with (a) which is an oxyalkylated polyamine having an hydroxyl number of from 300 to 900;
  (c) a polyol which reacts sluggishly with (a) which is an oxyalkylated polyhydric alcohol having an hydroxyl number of from 40 to 700;
  (d) from 0.5 to 2.0 parts, per 100 parts by weight of (b) plus (c), of acetyl acetone as a chelating agent; and
  (e) a volatile organic liquid blowing agent; the ratio of (b) to (c) being from 35:65 to 65:35, by weight, and the said composition foaming in the said closed mold and changing to a rigid state with an integrally formed solid, rigid skin on the outer surface, and thereafter removing the resulting article from the mold.

3. A method as in claim 2 in which the thickness of the skin is from 1/64 inch to 1/2 inch, the density of the solid skin is from 25 to 70 pounds per cubic foot and the density of the foamed core is from 2 to 55 pounds per cubic foot.

4. A method as in claim 2 in which the amount of acetyl acetone is from 1 to 2 parts, per 100 parts by weight of (b) plus (c), the ratio of (b) to (c) is from 45:55 to 55:45, by weight, the thickness of the skin is from 1/38 to 1/4 inch, the density of the solid skin is from 45 to 65 pounds, per cubic foot and the density of the foamed core is from 4 to 20 pounds per cubic foot.

References Cited

UNITED STATES PATENTS

| | | | |
|---|---|---|---|
| 3,137,671 | 6/1964 | Bosshard | 260—2.5 X |
| 3,278,486 | 10/1966 | Meek | 260—2.5 X |
| 2,801,990 | 8/1957 | Seeger | 260—75 X |
| 3,314,834 | 4/1967 | Walden | 260—77.5 A |
| 3,291,660 | 12/1966 | Oberth | 260—77.5 AB |
| 2,933,462 | 4/1960 | Fischer | 260—2.5 AB |
| 3,523,918 | 8/1970 | Gonzalez | 264—48 |
| 3,635,906 | 1/1972 | Jayawant | 260—18 TN |

FOREIGN PATENTS

| | | | |
|---|---|---|---|
| 1,160,041 | 7/1961 | Great Britain | 260—2.5 |
| 742,756 | 9/1966 | Canada | 260—2.5 AQ |
| 750,480 | 1/1967 | Canada | 260—2.5 AQ |
| 541,561 | 5/1957 | Canada | 260—77.5 |
| 627,424 | 9/1961 | Canada | 260—77.5 AB |

OTHER REFERENCES

Integral Skin Urethane Foam Molding; Wirtz; Journal of Cellular Plastics, September/October 1969, vol. 5, No. 5; pp. 304–309.

Technical Bulletin—402, Isonate 143L; Upjohn Co.; June 1, 1969; pages 1 and 3 to 10 and 23.

Product Report, Isonal C–100; Upjohn Co.; September 1966, 1 page only.

DONALD E. CZAJA, Primary Examiner

C. W. IVY, Assistant Examiner

U.S. Cl. X.R.

260—2.5 AQ, 2.5 AB, 2.5 AC, 2.5 AK, 453 SP; 264—48, 51, Dig. 14